(12) United States Patent
Jaubert et al.

(10) Patent No.: US 9,789,591 B2
(45) Date of Patent: Oct. 17, 2017

(54) METHOD FOR PRODUCING A JIG FOR TUBES HAVING BENT SECTIONS, AND RESULTING JIG

(71) Applicant: ADMC Holding, LLC, Lebanon, OH (US)

(72) Inventors: Philippe Jaubert, Cologne (FR); Regis Pellat, Colomiers (FR)

(73) Assignee: ADMC HOLDING, LLC, Lebanon, OH (US)

( * ) Notice: Subject to any disclaimer, the term of this patent is extended or adjusted under 35 U.S.C. 154(b) by 45 days.

(21) Appl. No.: 14/438,042

(22) PCT Filed: Oct. 10, 2013

(86) PCT No.: PCT/FR2013/000264
§ 371 (c)(1),
(2) Date: Apr. 23, 2015

(87) PCT Pub. No.: WO2014/064345
PCT Pub. Date: May 1, 2014

(65) Prior Publication Data
US 2015/0258664 A1 Sep. 17, 2015

(30) Foreign Application Priority Data
Oct. 25, 2012 (FR) ..................... 12 02844

(51) Int. Cl.
*B25B 11/02* (2006.01)
*G01B 3/14* (2006.01)

(52) U.S. Cl.
CPC .............. *B25B 11/02* (2013.01); *G01B 3/14* (2013.01); *Y10T 29/49895* (2015.01); *Y10T 29/49899* (2015.01); *Y10T 29/49908* (2015.01); *Y10T 29/49924* (2015.01); *Y10T 29/49998* (2015.01)

(58) Field of Classification Search
CPC ..... B25B 11/02; G01B 3/14; Y10T 29/49899; Y10T 29/49908; Y10T 29/49924; Y10T 29/49998; Y10T 29/49895
See application file for complete search history.

(56) References Cited

U.S. PATENT DOCUMENTS 5,208,995 A    5/1993    McKendrick
2007/0011891 A1   1/2007    Jaubert

FOREIGN PATENT DOCUMENTS

DE    102005007441    3/2006
DE    102010000499    7/2011
WO      03078921      9/2003

*Primary Examiner* — John C Hong
(74) *Attorney, Agent, or Firm* — Welsh Flaxman & Gitler LLC

(57) ABSTRACT

The invention relates to a method for producing a jig (M) for the thermal forming and/or inspection of a tube (T) of neutral axis (x) and comprising a bent sections (c1-c3) connected by straight sections (d2-d3). The method consists in producing n individual jigs (M1-M3) each comprising a section of duct (18, 18') of planar neutral axis (χ) for guiding a tube segment formed by one of the n bent sections of the tube (T) and by a predetermined length of each of the straight sections (d1-d4) extending from said bent section, said predetermined length corresponding to either all or part of the length of the straight section; and assembling the n individual jigs (M1-M3) with the sections of guide duct in the continuation of one another and with a relative orientation of the individual jigs adapted to provide a relative orientation between the n planes defined by the neutral axis (χ) of the n sections of guide duct (18, 18') that is identical to the relative orientation between the n bending planes (P1, P2, P3) defined by the n bent sections (c1-c3) of the tube (T).

11 Claims, 8 Drawing Sheets

METHOD FOR PRODUCING A JIG FOR TUBES HAVING BENT SECTIONS, AND RESULTING JIG

Figure 1:
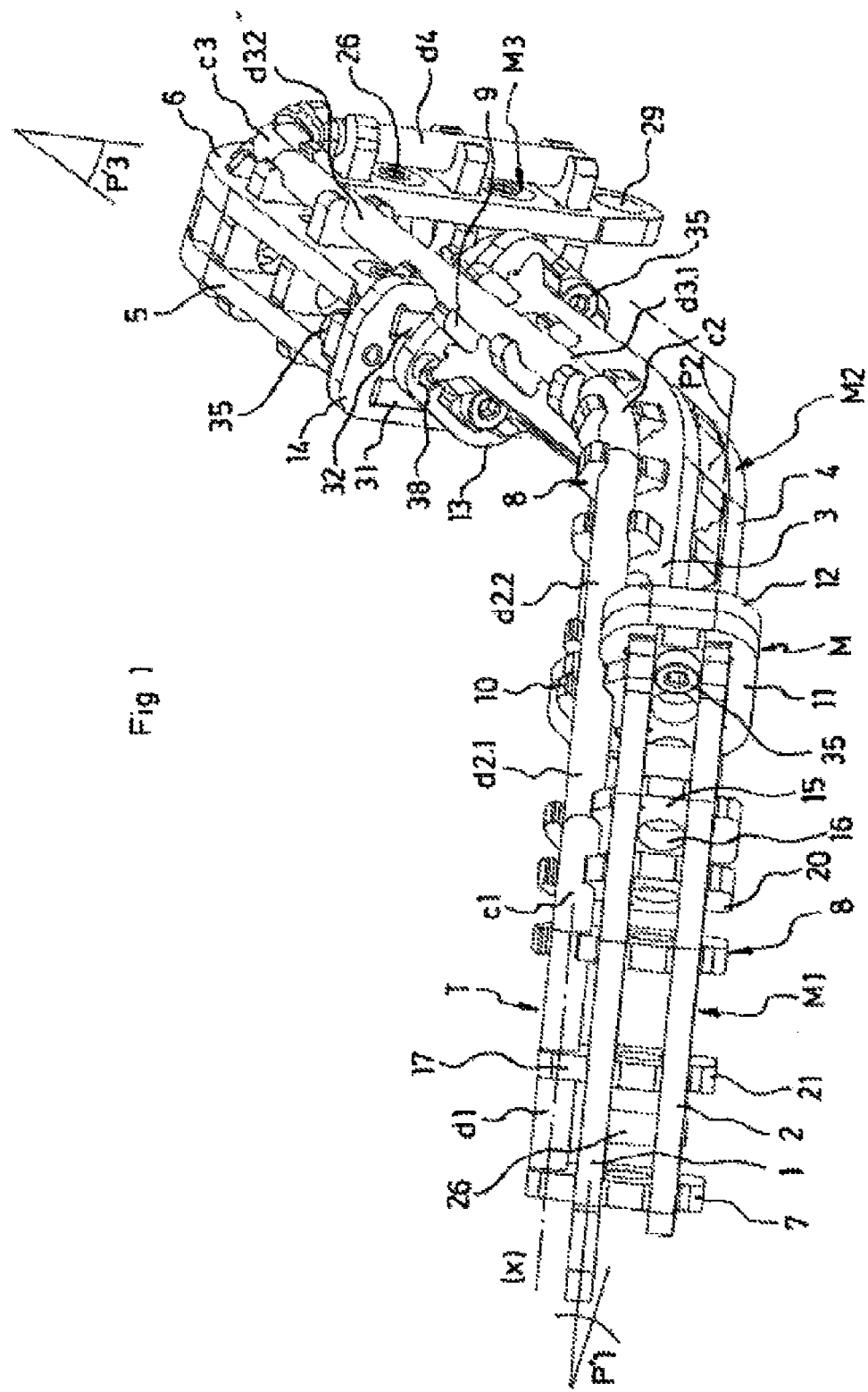

The invention regards a method for producing a jig for tubes having bent sections and more specifically for producing a forming jig designed for production, through thermal forming of plastic tubes and/or a jig for inspecting the geometry of bent tubes. The invention also extends to jigs produced by the implementation of this process.

The tubes, being plastic tubes, made of plastic materials of the type like thermoplastic polymers, such as polyamide, used among other in the automotive and aeronautics fields, and having bent sections, are presently manufactured by thermal forming of tubes fitted in forming jigs comprising:

A metal tube, called molding tube, with a diameter substantially greater than that of the plastic tubes, bent and/or formed so as to present the longitudinal profile of said plastic tubes and comprising a partially cut out peripheral wall to permit the insertion, the keeping in place, then the removal of a plastic tube, And a base on which the molding tube is joined with pinpoint connection components distributed along the molding tube and adapted to rigidify the latter.

The manufacture of each of these forming jigs requires in the first place producing the molding tube and for that purpose:

To bend and/or form a metal tube with a substantially greater diameter than that of the plastic tube, so as to produce a molding tube having the longitudinal profile of said plastic tube, To partially cut out the peripheral wall of the molding tube so as to permit the insertion of the plastic tube, keeping it in place during the thermal forming stage, then removing it after forming.

This manufacture then comprises a stiffening stage of the molding tube that consists of joining it on a base using pinpoint connection components distributed along said molding tube.

Taking into account the complexity of the longitudinal profiles of plastic tubes to be produced with these forming jigs, manufacturing of the molding tubes (bending, cutouts . . . ) is entirely manual and consequently the final geometric features of the forming jigs depend directly on the experience and know-how of qualified personnel responsible for this manufacturing.

Therefore, whatever this experience and know-how may be, there are relatively significant geometric differences between the forming jigs supposed to be identical.

However, taking into account the production rates required and the relatively long time required for producing a plastic tube (heating time, handling, . . . ), each plastic tube requires the use of several forming jigs.

Consequently, in practice, there is a significant heterogeneousness between the plastic tubes of the same reference produced with different forming jigs; this leads among other to potential assembly problems of the plastic tubes, or even to rejecting them.

By design, these jigs could also be used for conducting an inspection of the bent tubes geometry. However, in practice, these jigs are not used for inspection purposes by reason of their high cost of manufacture, and the time required for introducing each tube to be inspected into the partially cut out molding tube that plays the role of inspection tube, then the removal of this tube to be inspected.

These inspection operations are in fact performed at this time with inspection jigs specifically designed for this function, comprising:

Either, as was described in the U.S. Pat. No. 6,029,333, US 2007/011891, WO 03/078921 patents, flat plates assembled on a base, each dedicated for guiding a straight section of the tube and on the straight upper edge on which are mounted guiding components of said straight tube section, Or, as described in the U.S. Pat. No. 5,412,877, U.S. Pat. No. 5,208,995, DE 10 2005 007441 patents, instead of flat plates, parallelepiped blocks in the upper surface, from which a straight gutter is formed adapted to hold a straight section of the tube, Or as described in the DE 10 2010 000499 patent, guiding blocks in the upper surface from which is formed a gutter, each resting on a supporting block installed on a base, and arranged so that gutters from said guiding blocks form a continuous duct or a duct sections, for guiding the tube.

This invention is aimed at providing low cost jigs that can be reproduced simply and industrially, and with a design adapted to permit their use either for forming plastic tubes, or for inspecting bent tubes.

For that purpose, the invention is aimed in the first place at a manufacturing process of a jig for thermal forming and/or inspecting a neutral axis (x) tube comprising n bent sections connected by straight sections, according to the invention for:

producing n individual jigs:
each dedicated to a tube segment made up of n bent sections of the tube and of a predetermined length, in part or in full, of each of the straight sections extending in the continuation of the bent section, so that each of said tube segments comprises a planar neutral axis (x) extending in a plane, called bending plane, which corresponds to the bending plane of the bent section of said tube segment, each comprising guiding means delimiting an open guiding duct section with a planar neutral axis (x') extending in a plane, with each of the guiding duct sections having on the one hand, the longitudinal profile of the tube segment and on the other hand, an adapted section to hold the latter, juxtaposing the n individual jigs with the guiding duct sections in the continuation of each other, and relatively orienting said individual jigs so as to obtain a relative orientation between the n planes defined by the neutral axes (x') of the guiding duct n sections, identical to the relative orientation between the n bending planes defined by the n bent sections of the tube, joining the n individual jigs among each other.

Consequently, the process of the invention consists of:
"dividing" each tube into several segments each comprising one of the n bent sections of said tube, with the peculiar feature of constituting "planar" segments, in other words, segments for which the neutral axis extends in a plane (please note that by neutral axis, we want to designate, according to the theory of beams, the line passing through the center of gravity of the straight sections of the tube, in other words, for a cylindrical tube of which the straight section is symmetric, with the line passing through the middle of said tube), producing n individual jigs of very simple design and production because they are each dedicated to a "planar" tube segment and thus comprising also "planar" guiding ducts, and reconstituting a full jig by assembling the individual jigs between each other.

The major interest of such a process resides in the simplicity of the individual jigs, from the point of view of their design as well as their production which leads to very favorable manufacturing costs, implementing industrial type manufacturing techniques that guarantee the perfect reproducibility of the jigs.

Moreover, such a process can be implemented for the manufacture of inspection jigs and for that purpose, one produces beneficially individual jigs provided with guiding means delimiting an overall guiding duct with a non-retentive section adapted to permit the introduction of the tube in said duct and then, the removal from said tube.

This process can also be implemented for the production of thermal forming jigs for plastic tubes and for that purpose, one produces beneficially individual jigs provided with guiding means delimiting an overall guiding duct with a retentive section adapted to permit the introduction and keeping the tube in said duct, then the removal of said tube.

In addition, according to the invention, each guiding duct section may consist of a continuous duct. However, beneficially according to the invention, the individual jigs are produced and are provided with guiding means made up of pinpoint guiding components comprising a groove with a section in combination with that of the tube, forming a duct made up of a succession of pinpoint supports of said tube.

Moreover, according to another mode of beneficial embodiment of the invention, individual jigs are produced comprising:

A base comprising at least a longitudinal flat plate, called the bottom base plate, in which multiple ports are provided aligned along a longitudinal line parallel to the planar neutral axis (x'), Planar guiding components adapted to be inserted in the ports of the bottom base plate of each base so that the grooves of said guiding components are focused on the neutral axis (x').

Indeed, such design leads to the production of jigs for which the essential components (base, guiding components) are made up of planar components, in other words, components that can be produced industrially by cutouts made in a plate by means of a cutout technique of a laser cutout type for instance.

In addition, according to the invention one produces beneficially a range of pinpoint guiding components provided with grooves that have symmetrical planes, including the neutral axis (x') for which the incline with respect to the plane of each bottom base plate varies over a value range between 0° and 90°.

Indeed, such a range of guiding components easily permits to reconstitute ducts that ensure perfect guiding of the tubes, and this in spite of the pinpoint nature of the guiding components.

In addition, according to another mode of beneficial embodiment of the invention aimed at guaranteeing a perfect rigidity of the jigs, individual jigs are produced for which the base is made up of two flat base plates assembled with securing components suited to keep them parallel at a predetermined distance one from the other:

A bottom base plate provided with ports in which a so-called anchoring portion of the guiding components is inserted, And a plate, called top base plate, with drilled ports through which a so-called guiding portion extends of the guiding components, in which the guiding groove is formed.

In addition, still from the point of view of increasing the rigidity of the jigs, one produces also beneficially according to the invention, guiding components comprising a middle portion having proper dimensions to form a spacer that defines the distance separating the two base plates of each base.

In addition, according to the invention, one produces beneficially a bottom base plate provided with traversing ports, and guiding components in the continuation of their anchoring portion, of a deformable locking portion of said guiding components.

This deformable locking portion of the guiding components is also beneficially designed so as to be frangible beyond a predetermined degree of deformation, so as to permit a possible disassembly of the individual jigs.

In addition, in a beneficial way according to the invention, individual jigs are produced comprising for the purpose of their assembly with a juxtaposed individual jig, an interface plate for each base plate, provided with an anchoring port of said base plate.

In addition, one produces beneficially a base for which the bottom base plate comprises, for each interface plate, a port installed so as to be coupled to said interface plate, and one plugs into said port a guiding component provided with securing means adapted to connect it to the interface plate.

These assembly elements are part of a jig production made up of flat elements (base, guiding components, assembly plate) which can be achieved in an industrial way by cutouts in a plate using a laser cutout technique for instance.

In addition, for the production of a jig for the thermal formation of a tube, according to the invention, beneficially, at the free end of the base of at least one of the individual jigs dedicated to an end segment of the tube, one provides an eyelet to keep the jig suspended, such as during the thermal formation stage in an oven.

The invention extends to a jig for the thermal forming and/or the inspection of a neutral axis (x) tube comprising n bent sections linked together by straight sections comprising:

n individual jigs each dedicated to a planar neutral axis (x) made up of n bent sections of the tube and of a predetermined length, in part or in full total, of each of the straight sections that extend in the continuation of said bent section, with each of said individual jigs comprising guiding means delimiting an open guiding duct section, of planar neutral axis (x') showing on the one hand, the longitudinal profile of the tube segment, and on the other hand, a section adapted to house the latter.

Assembly means of the n individual jigs adapted to assemble them with the guiding duct sections in the continuation of each other, and with a relative orientation of said individual jigs adapted so that the relative orientation between the n planes defined by the neutral axes (x') of the n guiding duct section is identical to the relative orientation between the n bending planes defined by the n bent sections of the tube.

Figure 2:
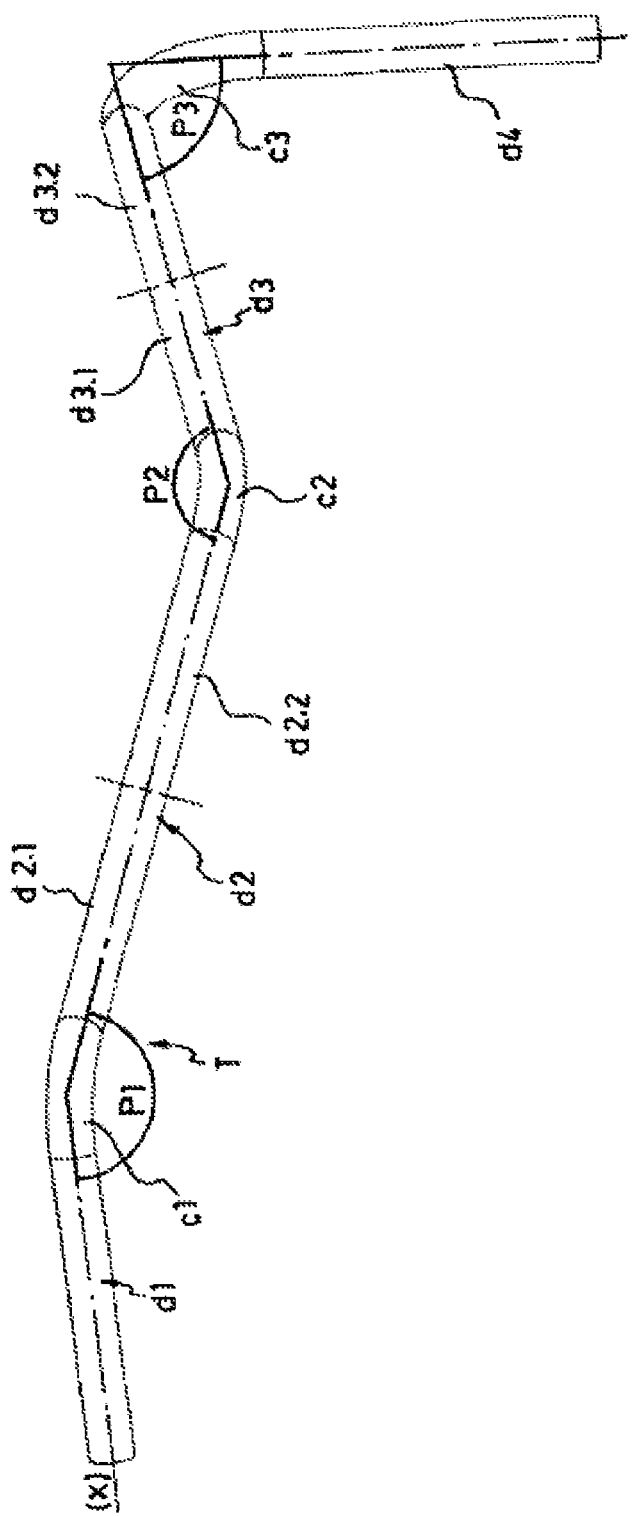
Figure 3:
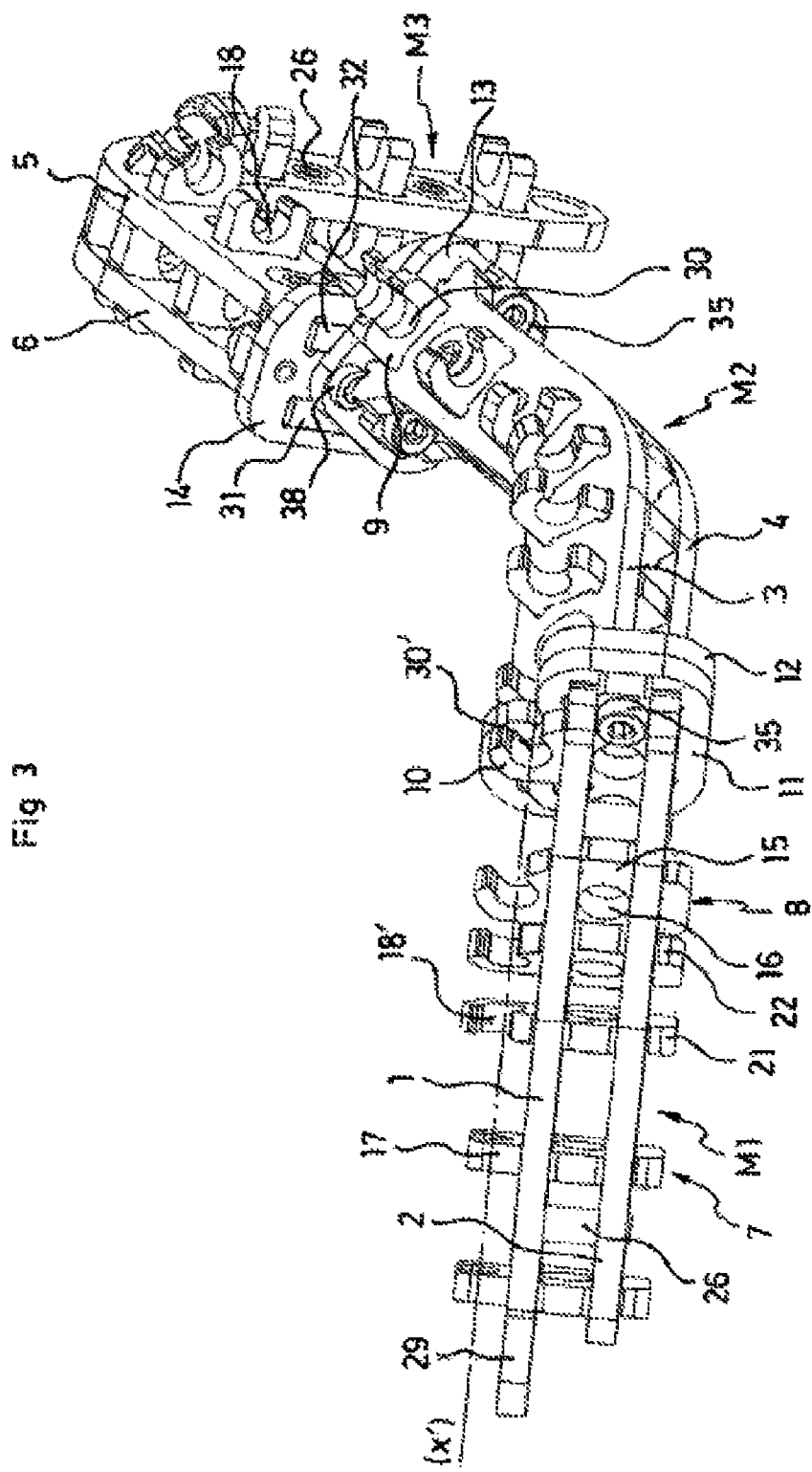
Figure 4:
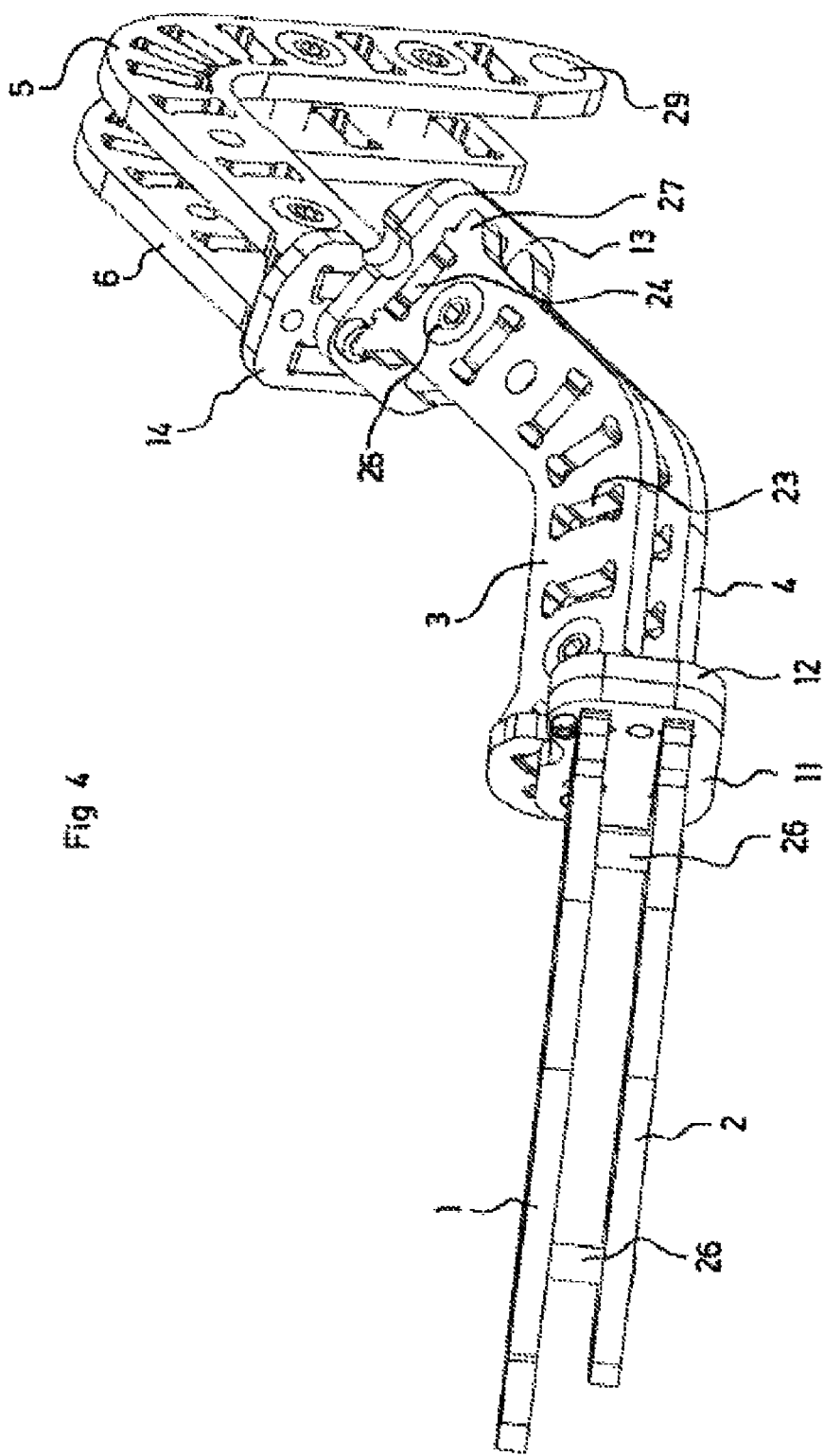
Figure 5:
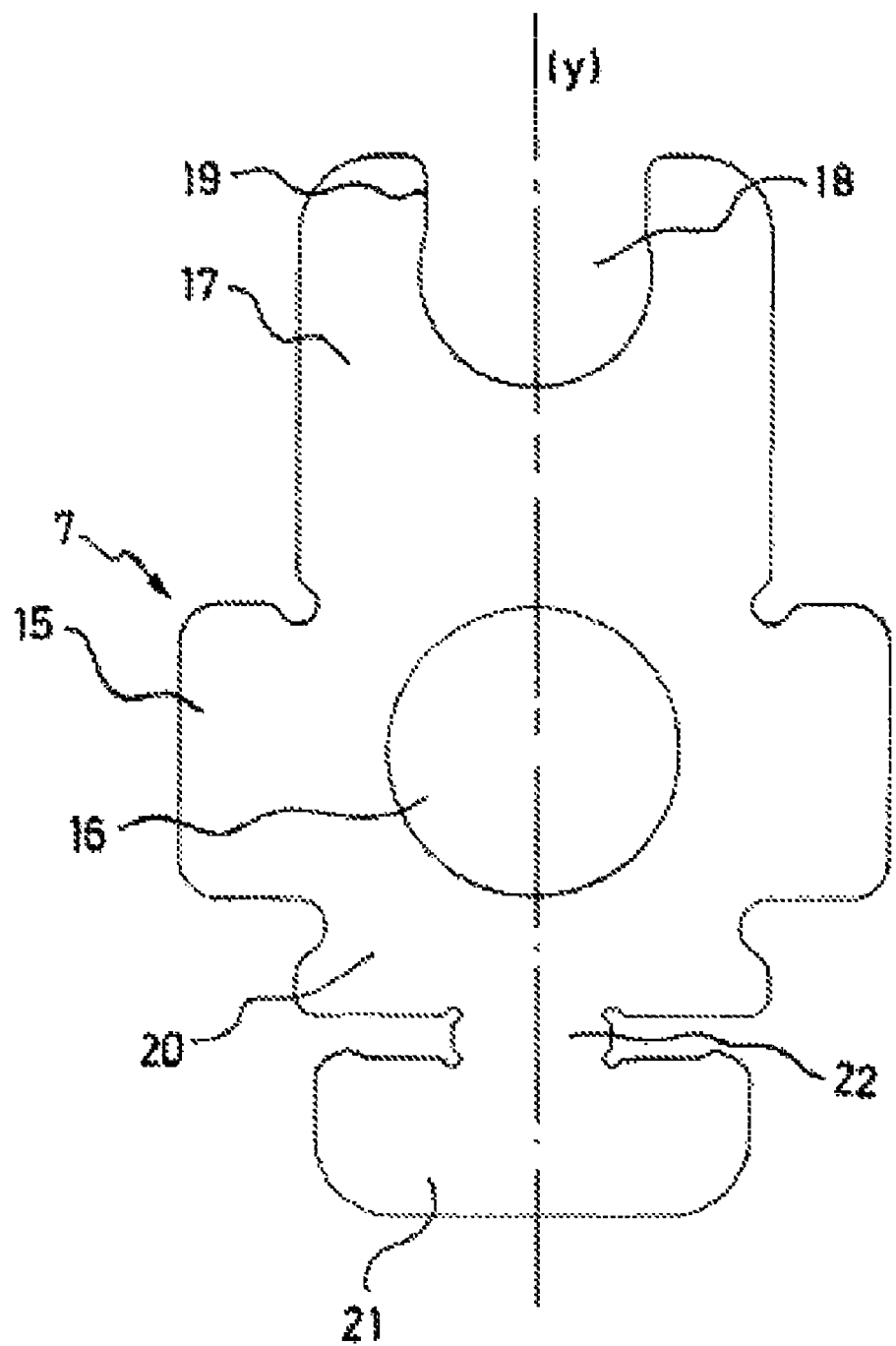
Figure 6:
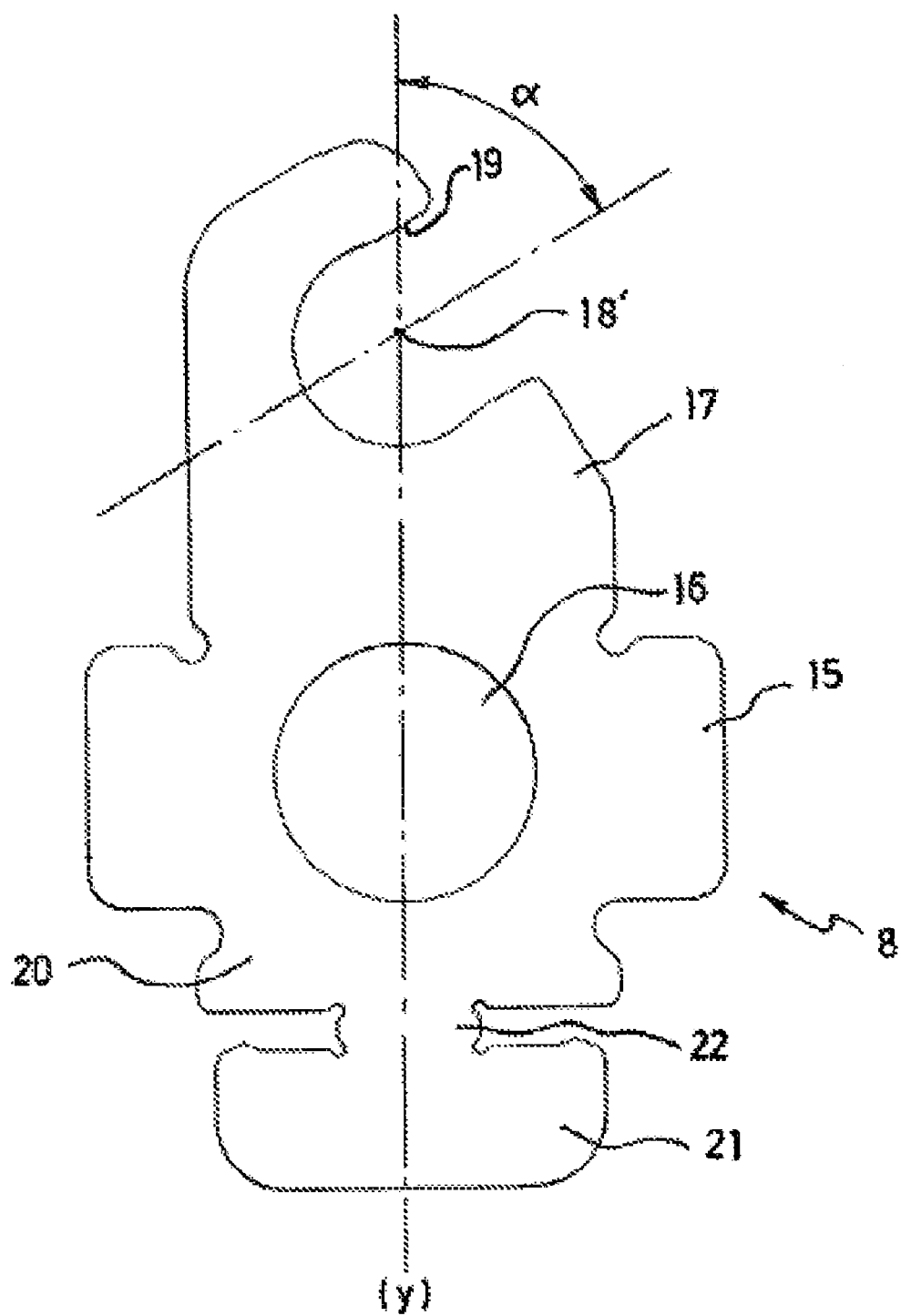
Figure 7:
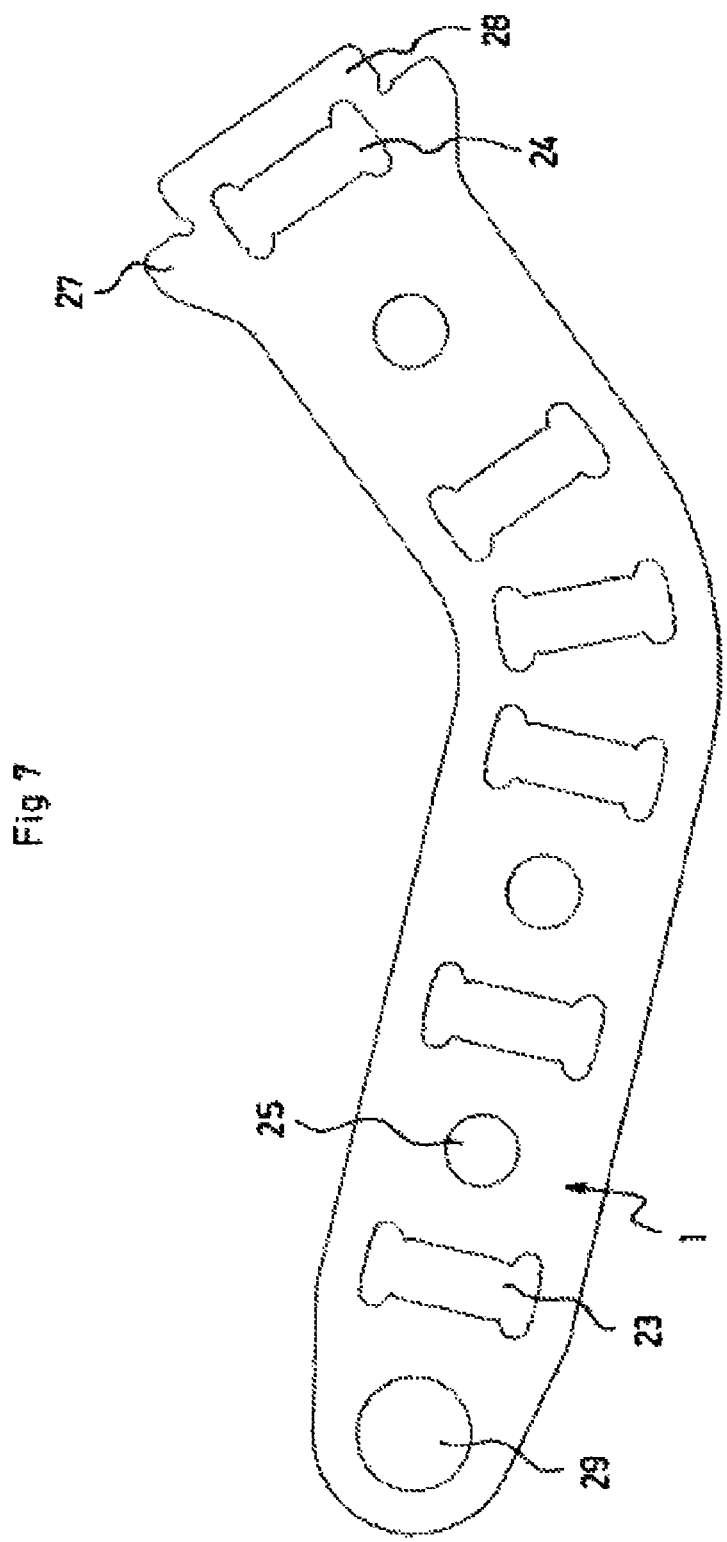
Figure 8:
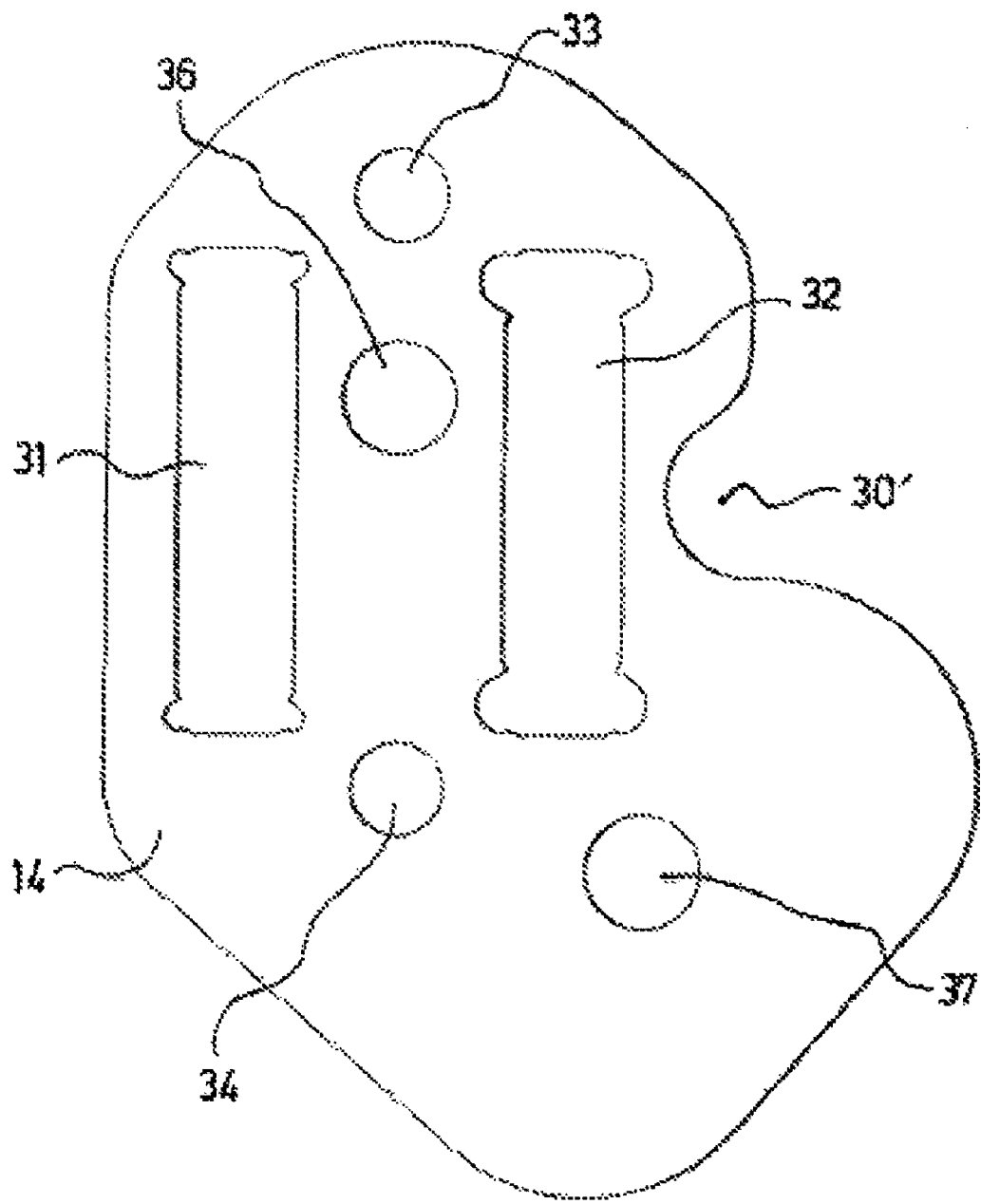

Other features, purposes and benefits of the invention will come to the foreground from the detailed description that follows referenced against the attached drawings which represent as a non-limiting example a preferential mode of embodiment. On these drawings:

FIG. 1 is a perspective view of a jig according to the invention for the thermal forming of a tube shown as positioned on this jig, FIG. 2 is a perspective view of this tube, FIG. 3 is a perspective view of the jig of FIG. 1 shown alone, without the tube, FIG. 4 is a perspective view of this jig without the guiding components, FIGS. 5 and 6 are front views of two guiding components on the jig according to the invention;

FIG. 7 is an overhead view of one of the base plates of this jig;

And FIG. 8 is a front view of one of the interface plates of this jig.

Jig M according to the invention shown for instance in FIGS. 1, 3 and 4 consists of a forming jig designed for the production by thermal forming of plastic tubes, such as tube T showing a neutral axis (x) shown on FIG. 2 that:

comprises two straight end sections d1, d4 and three bent sections c1, c2, c3 linked by straight sections d2 and d3 respectively, for the production of jig M according to the invention process, is considered as consisting of a tubular component made up of the end-to-end assembly of three planar tube segments (in other words, where the neutral axis is planar):

A first segment made up of a straight section d1, of bent section c1 and of a first portion d2.1 of the straight section d2 (generally, half of this section d2), with said first segment comprising a neutral axis that extends into a plane P1 corresponding to the bending plane of bent section c1, A second segment made up of the section portion d2.2 of straight section d2, of bent section c2 and of a first portion d3.1 of the straight section d3 (generally half of this section d3), with said second segment comprising a neutral axis extending into a plane P2 corresponding to the bending plane of bent section c2, And a third segment made up of the second portion d3.2 of straight section d3, of bent section c3 and of straight section d4, with said third segment comprising a neutral axis extending into a plane P3 corresponding to the bending plane of the bent section c3.

On the basis of this breakdown of tube T into three planar tube segments, jig M according to the invention is made up of three individual jigs M1, M2, M3 each dedicated to one of said tube segments and each adapted to delimit a guiding duct section showing the same longitudinal profile as that of said tube segment, and thus consisting of a planar guiding duct section for which the neutral axis (x') coincides with the neutral axis (x) of the tube segment.

Each of these jigs M1, M2, M3 consists of elements obtained by cutouts in planar plates and consisting mainly of:

A base made up of two identical flat base plates consisting of a so-called bottom base plate, respectively 1, 3, 5 and a so-called upper base plate, respectively 2, 4, 6, Pinpoint guiding components 7-10 adapted to delimit the guiding duct sections, Interface plates 11-14 for the end-to-end assembly of the individual jigs M1, M2, M3.

In the first place, the guiding components 7-10 comprise a groove of a section with a diameter substantially greater than the diameter of tube T, adapted to form a duct produced by a succession of pinpoint supports of said tube. These guiding components are declined in a range of pinpoint guiding components provided with grooves that have symmetrical planes including the neutral axis (x') for which the incline with respect to the planes of the base plates 2-6 varies over a value range between 0° and 90°. For example:

FIG. 5 represents as such a guiding component 7 provided with a groove 18 for which the symmetrical plane is inclined by an angle of 90° with respect to the plane of base plates 1-6, and coincides as such with a plane (y) that incorporates neutral axis (x') and orthogonal to the plane of the base plates, FIG. 6 represents a guiding component 8 provided with a groove 18' for which the symmetrical plane is included by an angle of 30° with respect to the plane of base plates 1-6 and thus forms an angle (a) of 60° with plane (y).

In addition, each groove 18, 18' presents a face 19 for inserting and removing from tube T, having a width substantially smaller than the diameter of said groove, adapted to give a retentive feature to the latter. Please note however that the retentive nature is for the use of jigs M for purposes of thermal forming of tubes. On the other hand, this retentive feature is eliminated when jigs M are to be used for inspecting the geometry of the tubes.

Irrespective of the orientation of groove 18, 18', each of these components 7, 8 comprises:

A middle portion 15 with dimensions adapted to form a spacer that defines the distance separating the two base plates 1-2, 3-4, 5-6 and for which the central part 16 is hollowed for purposes of weight gain, An upper guiding portion 17 in which groove 18, 18 is formed, A bottom anchoring portion 20 extended by a locking portion 21 forming a locking "key" or "stop" linked to the anchoring portion 20 by a lesser resistance area 22 frangible beyond a degree of deformation of said frangible area.

Such a "key" permits to provide perfect relative blocking among the blocking components 7-10 and the bottom base plates 1, 3, 5 while permitting a possible disassembly of the individual jigs M1, M2, M3.

Each base plate 1-6 has the general form of a rigid plate ribbon or strip of which the planar faces are oriented on an axis that coincides with the neutral axis (x') of the duct section formed by individual jig M1, M2, M3.

Shown as an example on FIG. 7, each of these base plates, like plate 1, is drilled with transversal ports such as 23, 24:

For the purpose of housing the anchoring portion 20 of the guiding components 7-10 regarding the bottom base plates 1, 3, 5, Through which extend the upper portions 17 of the guiding components 7-10 regarding the top base plates 2, 4, 6.

For purposes of assembling each jig M1, M2, M3 with the juxtaposed jig, these base plates 1-6 include also and at least an anchoring end section 28 separated from the common section of said base plate, by a stop section 27 with a width greater than the one of the common section.

In addition, one of the transversal ports 24 is located at each stop section 27 so as to adjoin the anchoring section 28. The purpose of this port 24 is to house the guiding components 9, 10 similar in their general design to the common guiding components 7, 8 but which differ from the latter by a middle portion 15, drilled, with a greater width, laterally on each side of the central recess 16 of holes for putting in place securing screws 35 for the guiding components 9, 10 to the adjacent interface plates 11-14.

In each of the base plates 1-6 threaded holes such as 25 are also drilled for installation of the securing screws such as 26 adapted to connect bottom base plate 1, 3, 5, and the top base plate 2, 4, 6 of each jig M1, M2, M3 in a relative position where they extend in parallel, at a distance one from the other defined by the height of the middle portion 15 of the guiding components 7-10.

Finally, one of the base plates of individual jigs M1 and M3, in the example base plates 1 and 6, is provided with an drilled eyelet 29 at its free end, in order to suspend jig M, for instance in an oven during the thermal forming stage.

Interface plates 11-14 are drilled with two transversal openings 31, 32 adapted to house each the anchoring section 28 of a base plate 1-6 in a position where the stop section 27 of said base plate is positioned against the interface plate.

Moreover, in each of these interface plates 11-14, two threaded openings 33, 34 have been drilled for installing the securing screws 35 to each interface plate 1-14 of the adjacent guiding component 9, 10 and consequently of base plates 1-6 comprising said guiding component.

Lastly, in each interface plate 11-14, two threaded openings 36, 37 are drilled for installing the securing screws 38 for connecting the two interface plates 11-12, 13-14 which are joined.

In addition, please note that the general form of the interface plates 11-14 is calculated on the basis of the relative orientations of jigs M1, M2, M3 so that the latter on the one hand show surfaces adapted to permit drilling the various openings 31, 32 and openings 33, 34, 36, 37 and on the other hand, do not hamper the passage of tube T; this last item permits to produce as shown on the figures, indentations such as 30, 30' of an adapted form, also to constitute an additional pinpoint support of said tube.

The jigs according to the invention described above can easily be reproduced industrially and show an adapted design to enable their use either for purposes of forming plastic tubes, or for purposes of inspecting bent tubes.

The invention claimed is:

1. A manufacturing process of a jig for thermal forming and/or inspection of a tube with a neutral axis (x) comprising n bent sections connected by straight sections, comprising the steps of:
    producing n individual jigs:
        each of the n individual jigs is dedicated to a tube segment made up of one of the n bent sections of the tube and a predetermined length, in part or in full, of each of the straight sections extending in a continuation of one of the n bent sections, so that each tube segment includes a planar neutral axis (x) that extends into a plane corresponding to a bending plane of the bent section of the tube segment,
        each of the n individual jigs comprising:
            guiding components delimiting an open guiding duct section with a planar neutral axis (x') extending into a plane, with the guiding duct section includes a longitudinal profile of the tube segment and a section adapted to house the tube segment, wherein the guiding components are made up of pinpoint guiding components having a groove with a section coupled to the tube forming a duct made up of a succession of pinpoint supports of the tube,
            a base having at least a longitudinal flat bottom base plate, in which multiple ports are aligned along a longitudinal line parallel to the planar neutral axes (x'), and
            planar guiding components adapted for insertion in the multiple ports of the bottom base plate of each base, provided so that the grooves of the guiding components are oriented towards the neutral axis (x'), the guiding components comprise a median portion with dimensions adapted to form a spacer that defines a distance separating two base plates of the base,
    juxtaposing the n individual jigs with the guiding duct sections of the n individual jigs in a continuation of each other to orient the n individual jigs so as to obtain a relative orientation between the planes defined by the neutral axes (x') of the guiding duct sections identical to a relative orientation among the bending planes defined by the n bent sections of the tube, and
    coupling the n individual jigs among each other.

2. The process according to claim 1, wherein the n individual jigs are produced with guiding means delimiting an overall guiding duct with a non-retentive section adapted to permit an insertion of the tube in the overall guiding duct and a removal of said tube.

3. The process according to claim 2, wherein the n individual jigs are produced with guiding means delimiting the overall guiding duct with a retentive section adapted to insert and keep the tube in place in said overall guiding duct, and then to remove the tube from the overall guiding duct.

4. The process according to claim 1, wherein a range of the pinpoint guiding components is produced with grooves showing symmetrical planes, including the planar neutral axis (x') for which an incline with respect to the plane of each bottom base plate varies over a value range between 0° and 90°.

5. The process according to claim 1, wherein the n individual jigs are produced using the base which is made up of two flat base plates assembled with securing components suitable to keep them parallel, at a predetermined distance from one another, a bottom base plate is provided with openings in which a so-called anchoring portion is installed with the guiding components, and a top base plate, in which ports are drilled through which extends a so-called guiding portion of the guiding components in which the groove is installed.

6. The process according to claim 5, wherein a bottom base plate is produced with transversal ports and guiding components in a continuation of their function as an anchoring portion, with a deformable portion that locks said guiding components.

7. The process according to claim 6, wherein the guiding components are produced with a deformable locking portion that is frangible beyond a predetermined degree of deformation.

8. The process according to claim 1, wherein the n individual jigs are produced for their assembly with a juxtaposed individual jig, an interface place for each base plate with a port for anchoring said base plate.

9. The process according to claim 8, wherein the bottom base plate comprises, for each interface plate that makes up the base plate, a port made for joining each interface plate.

10. The process according to claim 1, comprising an eyelet for holding the jig by suspension, the eyelet being installed at a free end of the base for producing the jig for the thermal forming of the tube.

11. A jig for thermal forming and/or inspecting a tube with a neutral axis (x) comprising n bent sections connected by straight sections, wherein it includes:
    n individual jigs each dedicated to a tube segment with a planar neutral axis (x) made up of one of the n bent sections of tube and having a predetermined length, in part or in full, for each of the straight sections extending into a continuation of said bent section, each of these individual jigs comprising:

guiding components delimiting an open guiding duct section, with a planar neutral axis (x'), showing on one hand, a longitudinal profile of the tube segment and on an other hand, a section adapted to house the tube segment, wherein the guiding components are made up of pinpoint guiding components having a groove with a section coupled to the tube forming a duct made up of a succession of pinpoint supports of the tube, a base having at least a longitudinal flat bottom base plate, in which multiple ports are aligned along a longitudinal line parallel to the planar neutral axes (x'), and planar guiding components adapted for insertion in the multiple ports of the bottom base plate of each base, provided so that the grooves of the guiding components are oriented towards the neutral axis (x'), the guiding components comprise a median portion with dimensions adapted to form a spacer that defines a distance separating two base plates of the base, and assembly means of the n individual jigs adapted to connect them with the guiding duct sections in the continuation of one another, and with a relative orientation of said individual jigs adapted so that a relative orientation between n planes defined by neutral axes (X') of the guiding duct sections is identical to a relative orientation between n bending planes defined by the n bent sections of the tube.

* * * * *